United States Patent [19]

Kiyonaga

[11] 4,061,487
[45] Dec. 6, 1977

[54] PROCESS FOR PRODUCING GLASS IN A ROTARY FURNACE

[75] Inventor: Kazuo Kiyonaga, Tarrytown, N.Y.

[73] Assignee: Union Carbide Corporation, New York, N.Y.

[21] Appl. No.: 751,196

[22] Filed: Dec. 16, 1976

Related U.S. Application Data

[63] Continuation-in-part of Ser. No. 701,677, July 1, 1976, abandoned, which is a continuation of Ser. No. 519,188, Oct. 30, 1974, abandoned.

[51] Int. Cl.² .................... C03B 5/16; F27B 14/00
[52] U.S. Cl. ........................................ 65/135; 65/136; 65/137; 65/337; 65/355; 432/13; 264/30
[58] Field of Search ................ 264/30; 65/134, 135, 65/136, 137, 337, 355; 432/13; 244/30, 134

[56] References Cited

U.S. PATENT DOCUMENTS

| | | | |
|---|---|---|---|
| 617,748 | 1/1899 | Hurley | 65/134 |
| 1,034,824 | 8/1912 | Owens | 65/337 |
| 1,390,614 | 9/1921 | Hurley | 65/356 |
| 1,831,619 | 11/1931 | Allen | 65/135 |
| 1,833,712 | 11/1931 | Hawke | 65/134 X |
| 1,841,464 | 1/1932 | Black | 65/337 X |
| 1,863,708 | 6/1932 | Zotos | 65/134 X |
| 1,877,714 | 9/1932 | Bulask | 65/134 X |
| 1,889,511 | 11/1932 | Amsler | 65/356 |
| 2,006,947 | 7/1935 | Ferguson | 65/134 |
| 2,834,157 | 5/1958 | Bowes | 65/356 X |
| 3,266,879 | 8/1966 | Kroyer et al. | 65/21 |
| 3,337,324 | 8/1967 | Cable, Jr. et al. | 65/135 X |
| 3,508,742 | 4/1970 | Minegishi | 432/13 X |
| 3,853,520 | 12/1974 | Rau | 65/134 |

*Primary Examiner*—S. Leon Bashore
*Assistant Examiner*—Frank W. Miga
*Attorney, Agent, or Firm*—Saul R. Bresch

[57] ABSTRACT

A continuous process for melting inorganic raw materials to produce molten glass in a generally cylindrical continuously rotating chamber comprising the following steps:

a. feeding the raw materials into the chamber;
b. providing a flame of high intensity heat produced by the combustion of fuel with a gas containing about 50 to about 100 percent by volume oxygen and directing the flame into the chamber in such a manner that the raw materials are melted; and
c. rotating said chamber at a sufficient speed and cooling the exterior of the chamber with a liquid coolant in such a manner that the inner surface of the chamber is coated with a layer of molten glass, the layer is solidified, and a solidified layer of glass is maintained throughout the process; and
d. withdrawing molten glass.

12 Claims, 1 Drawing Figure

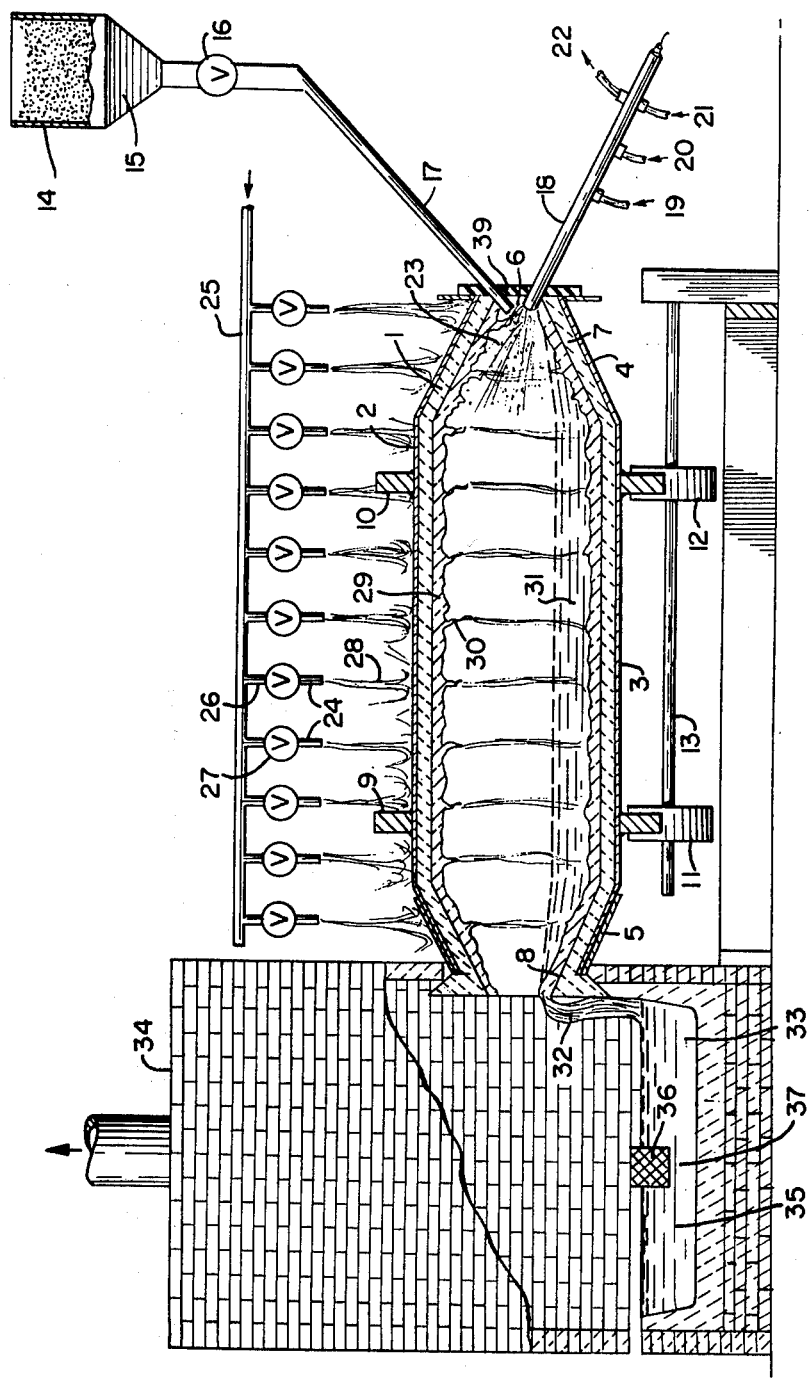

PROCESS FOR PRODUCING GLASS IN A ROTARY FURNACE

This application is a continuation-in-part of application Ser. No. 701,677, filed July 1, 1976 now abandoned, which is a continuation of application Ser. No. 519,188, filed on Oct. 30, 1974 now abandoned, which is incorporated by reference herein.

FIELD OF THE INVENTION

This invention relates to the melting of inorganic materials to produce molten glass and, more particularly, to a continuous process for melting such materials in a rotary furnace.

DESCRIPTION OF THE PRIOR ART

Of the various types of furnaces used to melt inorganic raw materials having high melting temperatures to produce glass, the direct fired, continuous, regenerative furnace is the most commonly used for large scale production. A typical melting furnace of this type comprises a generally rectangular refractory tank which is divided into two sections by a bridgewall containing a submerged opening or throat. The first section is used for melting, while the second is used for refining, i.e., to eliminate bubbles and unmelted "stones". The glass depth within the tank may vary from about 1½ to 5 feet, depending upon the type and color of the glass being produced. Such a furnace measures about 80 feet long by about 60 feet wide, and can produce about 150 tons of glass per day. The melting section of the furnace is maintained at a temperature of about 2700° to about 2900° F in order to melt the batch. In the melting operation, carbon dioxide and water vapor are evolved from the carbonates and moisture in the raw materials and cause the molten glass to become foamy. The high temperature and the reduced viscosity of the molten glass helps to eliminate these gas bubbles by causing them to rise to the surface of the molten glass. During the melting process convection currents within the molten pool help to keep the molten glass homogeneous and provide the only mixing action in this type of melting tank. From the melting section of the tank the molten glass passes through the submerged throat into the refining section. After the bubbles have been eliminated, the molten glass, which has cooled by about 200° to about 400° F, flows from the refining chamber to glass forming equipment.

Heat required for melting is provided by combusting fuel with air in a regenerative firing system using dual chambers filled with brick checkerwork. While the hot exhaust gases from the melter pass through and heat one chamber, combustion air is preheated in the other chamber. The functions of each chamber are reversed at regular intervals. A common arrangement is to place a regenerative chamber on each side of the melting tank and to fire alternately from one side of the tank at a time.

These large, continuous, regenerative-type furnaces require high capital investment and operate at low thermal efficiencies, which, typically range from about 15 to 30 percent. With the hope of reducing capital requirement and improving thermal efficiency of such furnaces, it has been proposed in the past to replace the melting section of these furnaces with a variety of refractory lined rotary furnaces fired by fuel-air flames.

Although capital investment may be reduced by using a rotary furnace as a melter and eliminating the regenerator, the prior art rotary furnaces suffer the following disadvantages: low thermal efficiency and inadequate heat transfer from flame to batch; excessive blowing of the batch by the combustion gases; and excessive refractory wear. The low thermal efficiency is primarily due to the use of ambient temperature air as the oxidant in the burner thereby causing inert nitrogen to absorb some of the heat generated and subsequently carry the heat out in the flue gases through the stack. Nitrogen also causes a reduction in flame temperature which reduces the rate of heat transfer to the raw materials thus leading to incomplete melting in the rotary melter. A further difficulty of using air as oxidant in the burner is the large volume of combustion gases produced per unit of heat input, this large volume of gases blowing excessive amounts of batch particles through the rotary melter and adding unmelted batch to the glass product. As compared to the use of pure oxygen, for example, the use of air produces more than three times the total volume of combustion gases per unit of heat input. It is of course possible to reduce the above problem of using air in the prior art rotary furnaces by heat exchanging the incoming cold air with the exiting hot flue gases. This would improve the thermal efficiency of the process but would reduce or nullify the savings of capital investment.

An additional disadvantage of prior art rotary furnaces relates to the problem of refractory wear which is very severe due to the continuous washing and fluxing action of the molten glass as it flows over the refractory. Under such conditions, any refractory will deteriorate by gradual dissolution into the molten glass. Thus, the use of oxygen or a 50% or more oxygen mixture as oxidant in the burner becomes totally impractical as the considerably higher flame temperature produced only hastens the rate of dissolution of refractory into the molten glass. To illustrate, when non-preheated oxygen is used instead of air to burn methane, the calculated adiabatic flame temperature is about 5030° F as compared to 3540° F with air and the heat transfer rate is about 10 times higher. When using pure oxygen or a 50% or more oxygen mixture for combustion, then, the problem of containment of the high temperature flame becomes a serious one. There appears to be no available refractory which can withstand the corrosive effects of the flowing molten glass and/or the higher temperatures generated by oxy-fuel flames.

SUMMARY OF THE INVENTION

An object of this invention, therefore, is to provide a continuous process whereby a high concentration of oxygen is used as the oxidant gas to obtain the benefits of oxygen and, at the same time, avoiding excessive refractory wear resulting from the high oxy-fuel flame temperature and the corrosive effects of the molten glass.

Other objects and advantages will become apparent hereinafter.

According to the present invention such a process has been discovered for melting inorganic raw materials to produce molten glass in a generally cylindrical continuously rotating chamber comprising the following steps:
 a. feeding the raw materials into the chamber;
 b. providing a flame of high intensity heat produced by the combustion of fuel with a gas containing about 50 to about 100 percent by volume oxygen and directing the flame into the chamber in such a manner that the raw materials are melted; and c. rotating said chamber at a sufficient speed and cooling the exterior of the chamber with a liquid coolant in such a manner that the inner surface of the chamber is coated with a layer of molten glass, the layer is solidified, and a solidified layer of glass is maintained throughout the process; and d. withdrawing molten glass.

DRAWING

The sole FIGURE of the drawing is a diagrammatic cross-sectional view of one form of apparatus in which the process of the invention can be carried out.

DESCRIPTION OF THE PREFERRED EMBODIMENT

The term "inorganic raw materials" is used to mean high temperature melting raw materials used in the manufacture of glass. These materials include scrap glass which is usually referred to as cullet. The raw materials, properly proportioned and mixed, ready for melting to produce a glass are referred to as "batch". The term "glass" means an inorganic product of fusion which solidifies to a rigid non-crystalline condition upon cooling. Most of the commonly used glasses are silicate glasses. These include container glass, plate glass, borosilicate glass, fused silica, special high melting glasses, glasses designed specifically for subsequent devitrification, sodium silicates, fiber glass, glass wool, slag wool and rock wool. Raw materials commonly used for making silicate glasses include: silica sand, feldspar, limestone, dolomite, soda ash, potash, borax and alumina. Minor ingredients such as arsenic, antimony, sulfates, and fluorides are frequently added to alter the properties of the glass. In addition, other metal oxides are often added to obtain the desired color. Metallurgical slags and naturally occurring rock are used in the production of slag wool and rock wool.

The terms "solid" and "solidified", are used to denote the state of the glass when the viscosity is high enough so that it no longer flows appreciably and is in a semi-rigid or rigid state hence appearing to be solid. In the present case, such a "solid" layer of glass forms on the chamber wall or on the refractory lining.

Although operation of the process is illustrated in this specification with silicate glass, the same process may be used to melt other raw materials to produce other types of glasses such as phosphate glasses.

In order to better understand the present invention, reference is made to the drawing which shows one form of a rotary furnace which may be used in the practice of the invention. Rotary furnace 1 comprising a carbon steel shell 2 has a cylindrical section 3, a truncated conical feed section 4, and a truncated conical discharge section 5. The entire inside surface of the furnace shell 2 is provided with a high alumina, refractory lining 7. At the discharge end, furnace 1 is provided with a refractory pouring lip 8 also made of high alumina refractory material. Two flanges 9 and 10 are welded to the straight section 3 of furnace 1. Flanges 9 and 10 are in contact with rollers 11 and 12 which are driven by shaft 13 rotated by a variable speed motor (not shown). Raw materials are fed to furnace 1 from hopper 15 through a motor driven variable speed rotary valve 16 which is used to control the feed rate of the raw materials into the open mouth 6 of the furnace. Feed pipe 17 near the feed end of the furnace is water cooled (not shown) to protect it since it protrudes several inches into the conical section 4 of furnace 1. A water cooled fuel-oxygen burner 18 which protrudes several inches into opening 6 of furnace 1 is used to provide heat for melting of the raw materials which are discharged into the furnace through pipe 17. Burner 18 is provided with suitable fuel gas lines 19 and oxidizing gas lines 20, and with cooling water inlet and discharge ports 21 and 22, respectively. Burner 18 is tilted at an angle from the horizontal axis of furnace 1 so that the discharge flame 23 and hot combustion gases emanating from burner 18 direct the feed material toward the walls of the furnace. This helps to prevent blowing of fine unmelted particles through the furnace and out the discharge end. By directing the flame and raw material feed at the walls of the furnace any blown material tends to stick to the walls of the furnace which are covered with a coating of molten glass.

Water cooling is provided to the outside of furnace 1 through a plurality of discharge ports 24. The cooling water is supplied through a header 25 and a plurality of pipes 26 which provide passages for the water through control valves 27 and direct individual streams of water 28 at the steel sheel 2. The cooling effect of the individual water streams causes part of the molten glass to coat the inside of refractory lining 7 in the form of a thin solidified layer or lining 29. This lining 29 is made of the same material as the molten glass and acts to protect the refractory lining 7 from the deteriorating effect of the molten glass. Because individual streams of water 28 are being projected onto the outer surface of shell 2, the shell is not uniformly cooled, but rather has annular cold bands running around the circumference of the shell. This causes some of the molten glass to solidify in annular ridges 30 on the inside surface of the furnace. The molten glass drips down from these ridges and forms a pool 31 at the bottom of the furnace. As the ridges 30 rotate toward the bottom, they tend to flatten out somewhat, but still remain as solidified ridges. Since furnace 1 is tilted slightly forward, toward the discharge end, the molten pool 31 moves slowly toward the discharge end, and eventually the molten glass flows out over lip 8 of the furnace.

The overflow 32 flows into refining chamber 34 which includes a refining zone 33 and a cooling or conditioning zone 35. These zones are separated by a refractory skimmer block 36. Block 36 causes the refined molten glass to flow from zone 33 to zone 35 through a neck section 37 thereby skimming off the top layer of molten glass which tends to contain gas bubbles. The molten glass from chamber 35 can be fed directly to a glass or fiber forming machine. The refining chamber 34 is constructed of refractory bricks and the chambers 33 and 35 are lined with conventional refractory materials.

As mentioned earlier, there are several advantages of using oxygen or 50% or more oxygen instead of air along as oxidant in the flame. When oxygen is used, the considerably higher temperature produced markedly increases the rate of heat transfer from flame to unmelted raw material thus shortening the time necessary for adequate melting; the thermal efficiency is improved due to the elimination or reduction in nitrogen volume and due to reduction in heat loss surface area because of the smaller size melter; and there is a significant reduction in blowing of the batch due to the smaller gas volume produced per unit of heat input. To obtain all of these advantages, it is preferred that the oxidant gas to the burner contain from about 50 to about 100 percent oxygen. In conventional glass melting furnaces as well as in the prior art rotating furnaces, the continuous use of such high concentrations of oxygen in the burner would be disastrous as it would cause rapid melting of refractory and eventual destruction of the furnaces.

It is found that the problem of using high concentrations of oxygen is solved by the use of a solidified layer of glass, which is directly in contact with the inside surface of the furnace shell or in contact with a refractory of maximum thickness described below such as refractory lining 7, which, in turn, is in contact with the inside surface of the water cooled furnace shell. In either case, the solidified glass adheres to the substrate, be it the shell or the refractory, and is maintained by external cooling provided by a liquid coolant. Thus, the solidified portion of the glass provides additional insulation and a protective layer and any melting of this "lining" during exposure to the high temperature flame during rotation does not contaminate the molten glass as they both have the same composition. Further, the external cooling of the revolving chamber serves to constantly replenish the solid layer of glass.

If a refractory lining is used, the thickness of the refractory is an important variable in the practice of the invention. Too thick a refractory layer is undesirable as the inner face of the refractory attains such high temperatures that some of the refractory is caused to melt and thus contaminate the glass product. In such a case, melting of the refractory continues until an equilibrium thickness is reached and a solidified layer of glass is formed on the refractory surface due to the external cooling of the shell. During this period and for a considerable time afterwards until the melting and refining zones are cleaned of refractory contaminants, the product quality will be diminished.

As noted there can be no refractory or the refractory can be a very thin layer. The only effect is that the thinner the layer of refractory, the higher the heat flux during startup. Since the glass when solidified is a good insulator at low temperatures, the negative effect of the high heat flux for the limited startup period is nullified for the most part. A refractory layer is preferred, however, because, in practice, it is simpler to place a layer of solidified glass over a refractory than directly against a metal shell.

In view of the foregoing, it is suggested that the maximum thickness of the refractory be limited as described below. Minimum thicknesses are a matter of practicality and are left to the choice of the operator.

The maximum thickness of the refractory layer is determined primarily by the temperature that is to be maintained at the interface between the refractory and solidified glass layers. With adequate external cooling, this interface is maintained at such temperatures that the glass adhering to the refractory is sufficiently viscous that it does not undergo appreciable flow and is in a semi-rigid or rigid state. Thus, the interface temperature does not exceed about the flow point temperature of glass defined as the temperature at which the glass has a viscosity of $10^5$ poise, which, depending upon the composition, usually ranges between about 1600° and about 1800° F. Preferably, the temperature at the refractory/glass interface is kept below the softening temperature of the solidified glass. The softening temperature of the solidified glass corresponds to the temperature at which the glass has a viscosity of $10^{7.5}$ to $10^{8.0}$ poise and generally ranges between about 1200° and about 1600°

F. The maximum thickness of the refractory layer may be calculated by use of the following equation:

$$X = K \frac{(T_1 - T_2)}{C}$$

wherein:
X = the maximum thickness in feet
K = the average thermal conductivity of the refractory layer between $T_1$ and $T_2$ in BTU per square foot of refractory area per ° F per hour per foot of refractory thickness
$T_1$ = the flow point temperature of the glass in ° F
$T_2$ = the average temperature of the external surface of the chamber in ° F
C = the average rate of removal of the heat from the external surface of the chamber in BTU per hour per square foot of surface.

It should be noted that for reasons already stated the thickness of the refractory layer calculated by use of the above equation represents about the thickness useful to maintain the temperature at the glass/refractory interface at $T_1$ of below, $T_1$ being such that the viscosity of the glass is sufficiently high that it is presumed to be solid. Typical heat removal rates (C) obtained in the subject rotary glass melter normally range from about 4,000 BTU/hr/ft² to about 15,000 BTU/hr/ft². Since the thermal conductivity of most of the refractories used in glass melting applications average, over a temperature range of 200° to 1600° F, from about 0.6 to 1.5 BTU per sq ft per hour per degree Fahrenheit per foot of thickness, the calculated range of maximum refractory thicknesses based on these refractories is shown to vary from about 0.03 feet to about 0.6 feet. This is in marked contrast to conventional glass melting furnace refractory thicknesses of 1.0 to 1.5 feet for crowns and 1 to 2 feet for sidewalls and bottoms.

Since in the present process the refractory layer having the suggested maximum thickness is not melted or degraded, almost any type of refractory material may be used provided it has a sufficiently high melting temperature and sufficient strength to support the solidified layer of glass and the molten glass itself. Thus, alumina, chrome-magnesite, magnesia, silica, and other refractory materials may be used. In order to obtain good contact between the refractory layer and the metal shell for efficient heat transfer, refractories of the types normally referred to as ramming mixes, plastic refractories, and castables may be used in combination with suitable attachment devices such as J-hooks, studs, or pins affixed to the shell. Bricks may also be used provided that good contact is made with the water cooled shell.

Rotation of the melting chamber serves to provide good mixing of the molten glass to produce a homogeneous glass mixture. At the batch feed end, the rotation aids in distributing the unmelted batch over the pool of molten glass to better expose it to the flame. The rate of rotation need not be very high as there is no intention to use centrifugal force to distribute the molten glass to the walls of the chamber. Another reason for rotating the chamber is to continuously coat the inside surface of the chamber so that, in combination with the external cooling provided, the solid layer of glass which is partially melted during the period of exposure to the hot flame is replenished. A wide range of rotation rates may be used. The most important consideration is that the rotation rate be sufficiently high so that, during the period that the wall is exposed to the high temperature flame, the solid layer of glass is not completely melted through to expose the refractory layer. Rotation rates of about 0.5 to about 30 rpm are satisfactory although a preferred range of rotation speed is about 1 to about 10 rpm.

Cooling of the exterior surface of the rotating shell with a liquid coolant may be accomplished by any of the following methods. For example, the lower section of the rotary furnace may be immersed in a cooling fluid bath; an annular cooling jacket may be used; a suitably designed spray or curtain of fluid may be used; and a pattern of directed streams as shown in the drawing may also be used. The cooling may be uniform to provide a smooth layer of solid glass or non-uniform to provide the annular ridges described above. Any conventional cooling fluid may be used, water being preferred. As noted, the cooling means must be sufficiently adequate that a solid layer of glass is formed and maintained within the rotating furnace. Exterior temperatures are expected to vary depending upon distance from the flame and location of the cooling zones but are usually maintained at an average of about 200° to about 600° F. It is desirable, that the cooling means utilized be capable of removing from about 4000 to about 15,000 BTU per square foot per hour since heat fluxes in approximately these ranges are needed to maintain a solid layer of glass.

Any of the conventional fuels may be used, e.g. natural gas, kerosene, fuel oils, or producer gas. Gas temperatures inside the furnace range from about 3000° F near the discharge end to about 5000° F at the oxygen-fuel flame.

The following example illustrates one manner in which the rotary furnace may be operated.

EXAMPLE

The apparatus measuring 2 feet in outside diameter at the mid-section with an overall length of 7 feet and the process described above are used to produce glass in accordance with the following run. The run includes four phases; the first phase involves bringing the furnace up to operating temperature and feeding sufficient cullet to line the furnace with a layer of solidified glass in order to protect the refractory lining (2 to 3 inches thick) of the furnace; the second phase involves continuous operation of the unit at steady state at feed rates of from 100 to 200 pounds of glass batch per hour; the third phase comprises a high production run in an attempt to reach the maximum capacity of the furnace; and the fourth phase involves a gradual shut down of the unit.

One of the principal advantages of the process of the present invention is the ease with which the furnace can be started up. It can be brought from room temperature to operating temperature in less than 36 hours. By comparison, conventional commercial glass melting units require almost 2 weeks to start-up.

The rotating furnace is started up by heating it for 12 hours with a burner using natural gas and air which supplies heat to the furnace at the rate of about 140,000 BTU/hr. Thereafter, the natural gas burner is replaced by a kerosene-oxygen burner and the firing rate is increased steadily over a 12 hour period from 300,000 to 600,000 BTU/hr. Furnace rotation is maintained at 0.5 rpm. During the last 4 hours of the start-up period, cullet is fed to the furnace to produce enough molten glass to provide about a 1 to 2 inch lining of solid glass in the furnace. After 3 additional hours of feeding at a rate of about 110 pounds per hour of cullet, a pool of molten glass is formed at the bottom of the furnace, and the first molten glass begins to pour from the discharge end of the rotary furnace into refining chamber 34.

Thereafter, the raw material is changed from cullet to cullet-free batch which is fed to the furnace at the rate of 100 pounds per hour with the firing rate from the burner at 700,000 BTU/hr. The furnace is operated at this feed rate continuously for 10 hours. During this period the firing rate is reduced in steps to 600,000 BTU/hr and finally to 500,000 BTU/hr at which rate the furnace is still able to melt 100 lbs/hr of batch and to overcome heat losses from the furnace.

The firing rate from the burner is then increased to 650,000 BTU/hr and after 1 hour at the increased firing rate, the feed rate is increased to 220 pounds per hour and rotation of the furnace increased to 2 rpm to assist in mixing of the molten glass. Operation at the 220 pound per hour rate is continued for 10 hours.

The third or high production phase of the test run is then initiated by raising the feed rate in four steps over a period of 5 hours to 1,000 pounds per hour of glass batch. The firing rate is correspondingly raised in 4 steps to $2.0 \times 10^6$ BTU/hr to provide sufficient heat for melting all of the raw glass batch. The high production rate portion of the run is continued for 4 hours. During this phase of the run, the average production rate is 872 pounds of melt per hour and over short intervals reaching 1,300 pounds per hour. Thereafter, the furnace is shut down over a period of 12 hours by stopping the feed and gradually reducing the firing rate of the burner.

The above run demonstrates that the process is capable of producing glass at a very high rate of production relative to the size of the rotary furnace. Based on calculations from the data obtained in the above and other prior runs, it is believed that a production rate of as much as 3,400 pounds per hour could be obtained in this furnace. A production rate of 2,000 pounds per hour is, however, more probably a practical operating limit for the furnace. The thermal efficiency of the furnace is very high in comparison to conventional glass melting furnaces since relatively little of the heat provided is lost. This is shown in the heat balance around the rotary melter during the third or high production phase of the test described as follows:

|  | BTU/hr | Percent of Actual Heat Input |
|---|---|---|
| Heat utilized for melting | 888,000 | 49.9 |
| Heat losses: | | |
| Sensible heat in flue gas | 757,000 | 42.5 |
| Water cooled feed chute | 12,000 | 0.7 |
| Water cooled burner | 10,000 | 0.6 |
| Water cooled furnace shell | 248,000 | 13.9 |
| Total heat out | 1,915,000 | 107.6 |
| Actual heat input | 1,779,000 | 100.0 |
| Discrepancy | 136,000 | 7.6 |

The above results show that almost 50 percent of the total heat supplied is utilized for glass melting and that the heat loss through the water cooled shell represents only about 14 percent of the total heat input. The hot flue gas, even though it leaves the furnace at around 3000° F carries with it only about 43% of the total heat input because of the considerably smaller volume due to oxygen use. This is somewhat higher than expected due to infiltration of air at the burner end. In any case, this hot flue gas stream can be used to maintain the desired temperature in the refining section and subsequently used to preheat the incoming fuel, oxygen, or raw materials to further improve the overall thermal efficiency of the process.

Furthermore, while the apparatus illustrates a separate burner 18 and feed tube 17 penetrating into the feed end of the furnace through cover plate 39, these two functions can be combined into a single piece of apparatus, such as a refractory deposition type burner.

I claim:

1. A continuous process for melting inorganic raw materials to produce molten glass in a generally cylindrical continuously rotating chamber comprising the following steps:
   a. feeding the raw materials into the chamber;
   b. providing a flame of high intensity heat produced by the combustion of fuel with a gas containing about 50 to about 100 percent by volume oxygen and directing the flame into the chamber in such a manner that the raw materials are melted; and
   c. rotating said chamber at a sufficient speed and cooling the exterior of the chamber with a liquid coolant in such a manner that the inner surface of the chamber is coated with a layer of molten glass, the layer is solidified, and a solidified layer of glass is maintained throughout the process whereby the solidified layer essentially prevents impurities from the inner surface of the chamber from entering the melt; and
   d. withdrawing molten glass.

2. The process defined in claim 1 wherein the inner surface of the chamber is lined with a layer of refractory and the refractory layer is coated with the layer of glass.

3. The process defined in claim 2 wherein the cooling is effected by directing a plurality of cooling fluid streams at the exterior of the chamber.

4. The process defined in claim 3 wherein the cooling fluid streams are directed in such a manner that the solidified layer of glass contains a plurality of annular ridges corresponding to the locations on the exterior of the chamber at which the streams are directed.

5. The process defined in claim 1 wherein the glass is a silicate glass.

6. The process defined in claim 2 wherein the glass is a silicate glass.

7. The process defined in claim 4 wherein the glass is a silicate glass.

8. The process defined in claim 5 wherein the cooling fluid is water.

9. The process defined in claim 6 wherein the cooling fluid is water.

10. The process defined in claim 7 wherein the cooling fluid is water.

11. The process defined in claim 2 wherein the refractory layer has a maximum thickness determined according to the following equation:

$$X = K \frac{(T_1 - T_2)}{C}$$

wherein:
$X$ = the maximum thickness in feet
$K$ = the average thermal conductivity of the refractory layer between $T_1$ and $T_2$ in BTU per square foot of refractory area per ° F per hour per foot of refractory thickness
$T_1$ = the flow point temperature of the glass in ° F
$T_2$ = the average temperature of the external surface of the chamber in ° F
$C$ = the average rate of removal of the heat from the external surface of the chamber in BTU per hour per square foot of surface 12. The process defined in claim 9 wherein the refractory layer has a maximum thickness determined according to the following equation:

$$X = K \frac{(T_1 - T_2)}{C}$$

wherein:
$X$ = the maximum thickness in feet
$K$ = the average thermal conductivity of the refractory layer between $T_1$ and $T_2$ in BTU per square foot of refractory area per ° F per hour per foot of refractory thickness
$T_1$ = the flow point temperature of the glass in ° F
$T_2$ = the average temperature of the external surface of the chamber in ° F
$C$ = the average rate of removal of the heat from the external surface of the chamber in BTU per hour per square foot of surface.

* * * * *

Disclaimer 4,061,487.—*Kazuo Kiyonaga*, Tarrytown, N.Y. PROCESS FOR PRODUCING GLASS IN A ROTARY FURNACE. Patent dated Dec. 6, 1977. Disclaimer filed June 25, 1979, by the assignee, *Union Carbide Corporation*.

Hereby enters this disclaimer to claims 1, 2, 3, 5, 6, 7, 8, 9 and 10 of said patent.

[*Official Gazette August 28, 1979.*]